US012036572B2

(12) United States Patent
Filippini

(10) Patent No.: US 12,036,572 B2
(45) Date of Patent: Jul. 16, 2024

(54) APPARATUS AND METHOD FOR APPLYING PAINT WITH ROLLER COATERS, PREFERABLY TO PHOTOVOLTAIC PANELS

(71) Applicant: CEFLA Società Cooperativa, Imola (IT)

(72) Inventor: Fabrizio Filippini, Imola (IT)

( * ) Notice: Subject to any disclaimer, the term of this patent is extended or adjusted under 35 U.S.C. 154(b) by 0 days.

(21) Appl. No.: 17/744,672

(22) Filed: May 15, 2022

(65) Prior Publication Data

US 2022/0371042 A1 Nov. 24, 2022

(30) Foreign Application Priority Data

May 20, 2021 (IT) ........................ 102021000013085

(51) Int. Cl.
*B05C 1/02* (2006.01)
*B05C 13/02* (2006.01)
*B05C 15/00* (2006.01)
*B05D 1/40* (2006.01)

(52) U.S. Cl.
CPC .............. *B05C 1/025* (2013.01); *B05C 13/02* (2013.01); *B05C 15/00* (2013.01); *B05D 1/40* (2013.01); *B05D 2203/35* (2013.01)

(58) Field of Classification Search
None
See application file for complete search history.

(56) References Cited

U.S. PATENT DOCUMENTS 5,297,568 A * 3/1994 Schmid ................ H05K 3/0085 134/131
5,976,256 A * 11/1999 Kawano ................ B05C 5/0254 118/684
6,139,639 A * 10/2000 Kitamura .............. B05C 5/0254 118/DIG. 2
6,258,167 B1 * 7/2001 Kawano .................. B05B 15/50 118/667
6,540,833 B1 * 4/2003 Gibson ................... B05C 13/00 118/712

(Continued)

FOREIGN PATENT DOCUMENTS

CN 106423711 2/2017
CN 110918370 3/2020
CN 112275531 1/2021

*Primary Examiner* — Jethro M. Pence
(74) *Attorney, Agent, or Firm* — Themis Law

(57) ABSTRACT

A roller coater for applying paint to mainly flat panels having different lengths includes a feed roller, an application head having applying roller and a dosing roller, and a panel conveyor. The feed roller has a cover, and the application head has vertical and a horizontal covers. Rotation supports enable a coupling and decoupling of the ends of the applying roller, and translation organs provide for withdrawing the applying roller along a L-shaped path, so as to cause an initial horizontal translation with a radial distancing, and a vertical translation. The translation organs include a vertical guide and a lifting organ for the applying roller, and removable coupling terminals at the ends of the applying roller. The interaxial distance between the feed and the applying rollers is at least equal to the length of the initial translation from the rotational supports, and shorter than the minimum length of the panels.

10 Claims, 9 Drawing Sheets

(56) References Cited

U.S. PATENT DOCUMENTS

| | | | | |
|---|---|---|---|---|
| 7,905,195 | B2 * | 3/2011 | Yamasaki | H01L 21/6715 198/689.1 |
| 8,079,662 | B2 * | 12/2011 | Nakajima | H01L 21/6715 414/781 |
| 8,196,543 | B2 * | 6/2012 | Nakajima | G02F 1/1309 347/19 |
| 8,230,804 | B1 * | 7/2012 | Barbieri | B05C 1/025 118/224 |
| 8,681,345 | B2 * | 3/2014 | Buehler | G01B 11/06 356/630 |
| 8,733,275 | B2 * | 5/2014 | Nishimori | B05C 11/025 118/323 |
| 9,314,811 | B1 | 4/2016 | Brophy et al. | |
| 9,393,594 | B2 * | 7/2016 | Logan | B05B 15/62 |
| 9,951,450 | B2 * | 4/2018 | Joung | D06B 1/02 |
| 11,660,632 | B2 * | 5/2023 | Bertola | B05C 11/1039 118/300 |
| 2003/0118741 | A1 * | 6/2003 | Gibson | B05C 11/1013 427/427.2 |
| 2009/0229516 | A1 * | 9/2009 | Sorbini | B05C 1/0856 118/223 |
| 2021/0016314 | A1 * | 1/2021 | Bertola | B05C 11/1039 |
| 2022/0371042 | A1 * | 11/2022 | Filippini | B05D 1/40 |
| 2022/0371947 | A1 * | 11/2022 | Filippini | G01B 5/068 |
| 2022/0379339 | A1 * | 12/2022 | Shida | B05C 5/027 |

* cited by examiner

APPARATUS AND METHOD FOR APPLYING PAINT WITH ROLLER COATERS, PREFERABLY TO PHOTOVOLTAIC PANELS

FIELD OF THE INVENTION

The present invention relates to an apparatus and a method for applying paint with roller coaters to mainly flat panels. In particular, said apparatus provides for the replacement of the applying roller in said apparatus. In the case of solar (photovoltaic) panels said mainly flat panels are glass panes. Moreover, said apparatus and method allow the precise measuring of the thickness of said glass panes or anyway of the panels painted with said roller coater, and to adjust the application head to the thickness measured for each panel or pane.

BACKGROUND OF THE INVENTION

Mainly flat panels means panels wherein two of the three dimensions are bigger than the third dimension, by at least one order of magnitude. Typically, the measures of said glass panes are 600×600×1.5 mm to 2000×1400×3 mm.

Typically, an apparatus for applying paint on products using the roller technology is provided with a conveying system, on which panels to be painted are laying. The panels are brought near the application head, made of two rollers: a first chromed dosing roller and a second rubber applying roller. A pump withdraws paint from a tank, and paint is conveyed to a tank formed by said pair of rollers, which are pressurized.

The transposition of paint from the applying roller onto the panel occurs through pressure. The quantity of paint is adjusted through the variation of the pressure applied on the applying roller by the dosing roller. Advantageously, a load cell system can be used, measuring the thrust force of the dosing roller onto the applying roller.

In the art, using reading bars is known in order to detect the actual measures of said panels to be painted, in particular their thickness.

One of the documents in the prior art is e.g., U.S. Pat. No. 9,314,811B1 to Enki Technology Inc. disclosing an apparatus for applying a sol-gel coating on solar panels. Said apparatus comprises an applying station for applying a coating through rollers, and a station for the jellification of the applied coating.

A further document in the prior art is CN106423711A to Anhui Jixingyuan Tech Co Ltd, which describes single-roller coating machine capable of being suitable for coating a non-planar plate. The single-roller coating machine comprises a coating machine base. A conveying device is arranged on the upper side of the coating machine base. The coating machine base on the lower side of the conveying device is provided with a main loop oil groove. Oil grooves are formed in the left side and the right side of the conveying device. A front side lifting device is installed on the side, with a feeding port on the conveying device. A rear side lifting device is installed on the side, with a discharging port of the conveying device. The upper end of the front side lifting device and the upper end of the rear side lifting device are provided with coating devices.

CN110918370A to Dongguan Bluesky Intelligent Equipment Co Ltd describes an automatic treatment agent coating equipment. The automatic treatment agent coating equipment is characterized by at least two automatic treatment agent coating units, wherein the two automatic treatment agent coating units are arranged on a machine frame along the conveying direction of a shoe material conveying mechanism and are used alternately; each automatic treatment agent unit coating is provided with at least one coating mechanism correspondingly; a control device is connected with a dose adjusting driving mechanism arranged on each coating mechanism. When the equipment works, a transition roller is intermittently driven by the dose adjusting driving mechanism. The roller body in the treatment agent coating device can be quickly cleaned, replaced and installed so that coating can occur without interruptions.

CN112275531A to Foshan Shuntu Tech Co Ltd discloses a panel coating machine. The coating machine comprises a rack; the rack is provided with a conveying belt used for conveying panels, a feeding mechanism used for providing paint for the coating mechanism, and a driving mechanism used to actuate the coating mechanism.

The apparatuses for painting solar panels on the market are affected by the recurring problem of replacing the applying roller. It is known that the application of paint on such panels requires a high precision of both the quantity and the uniformity of the applied paint layer.

To this aim, a special applying roller must be used, which is lined with a polyurethane elastomer, provided with a finely rectified surface, which is easily damaged. Therefore, the applying roller must be often replaced in order to work and produce with the indispensable quality. In addition to the normal wear, said applying roller enters into contact with the sharp edges of glass panes, which can easily damage it.

Apparatuses of this kind are available on the market, but due to their built none of the existing apparatuses can provide for a fast replacement of the applying roller without the removal of the covers needed to protect human operators from the dangerous contact with the different rotating mechanical parts. In fact, in order to accelerate maintenance times, during the replacement of the applying roller, many of the machines available on the market expose dangerous rotating mechanical parts in order to avoid the time-consuming removal of protective covers.

Moreover, it is known that the glass panes to be painted can be provided with a thickness slightly different on their external sides, i.e., the sides parallel to the conveying direction (left and right side). E.g., a glass pane can be 3 mm thick on the right side and 2.8 mm thick on the left side: this difference can prevent the precise application of paint.

Devices for measuring the thickness of glass panes are known; e.g., using a small roller placed at the entry of the application head is known. Nonetheless, such device is affected by some drawbacks.

The detrimental effect linked to the rolling of the small roller on the glass surface must be accounted for, which introduces measuring mistakes due to concentricity and hopping. Moreover, as said small roller works leaning on the top surface of the glass pane, which is conveyed by the conveying belt, deformations both of the glass pane and of the conveying belt can make such measuring imprecise and unsteady.

SUMMARY OF THE INVENTION

Aim of the present invention is providing an apparatus and a fast and cheap method for the replacing of applying rollers, allowing human operators to work safely on the roller coater.

A further aim of the present invention is providing an apparatus and a method for precisely measuring the thickness of said glass panes, allowing an easy and fast adjusting of the position of the application head with respect to the single glass pane.

This object is achieved by an apparatus and a method having the features of the independent claims. Advantageous embodiments and refinements are specified in claims dependent thereon.

The apparatus according to the present invention comprises an applying roller supported by suitable lifting systems, which roller can be lifted without touching any mechanical part and without the need for removing further covers. Said lifting must occur during downtimes, when the roller coater is not applying paint.

In the apparatus according to the present invention, the rotating systems are protected through protective and guarded covers, so that dangerous parts cannot be reached, with the exception of the adjusting organs needed for adjustments. A multifunctional Programmable Logic Controller (PLC) provided with a display allows to adjust and control all the working parameters.

As it is clear from the dependent claims, the apparatus according to the present invention is provided with a cover that separates from the environment the applying roller on its vertical side oriented toward the pressing roller and optionally even for a portion of the top horizontal side of said applying roller. The distance between pressing roller and dosing roller is preferably bigger than the diameter of the applying roller, while the applying roller is mounted on rotating supports, having the ends protruding from the corresponding heads of a rotation shaft of said applying roller, said rotating support being provided with a disengaging opening of the respective end of the rotating shaft. Such opening can be opened and closed, for each rotating support there being provided a translation guide that is substantially horizontal, and preferably oriented along a plane that is slightly tilted downward. Said guide detaches in correspondence of said disengaging opening of the corresponding support. Each guide ends at a pre-defined distance from the corresponding rotating support with a translation end of stroke of the corresponding end of the rotation shaft of the applying roller. The position of said ends of stroke is chosen so that the applying roller can be acceded to from top through the grabbing organs of a lifting device, and the applying roller is placed, on one side, at a given distance from the pressing roller and, at the other side, from a top horizontal cover. The grabbing organs of the applying roller can be grabbing organs for the ends of the rotating shaft of the applying roller, like, e.g., annular elements coupled with a lifting actuator of a lifting device.

In a second, more sophisticated embodiment, the apparatus comprises a bridge device, in its turn comprising two measuring systems of the thickness of the glass pane to be measured. The apparatus according to this second embodiment is provided with two measuring systems, one on each external side (i.e., right and left side) of the glass pane mounted on said bridge support, which is an accessory of the roller coater. Said bridge device can be placed in different points of the production line with the aim of measuring the thickness of the glass panes and adjusting the inclination of the application head to the specific glass pane to be painted. Obviously, said bridge device must be placed upstream the roller coater, preferably in its immediate proximity. Said bridge device comprises two measuring devices, provided with centesimal precision, which can be moved along the width of the glass pane in order to adjust the measuring system to the different widths of said glass panes. The bridge device is provided with suitable photocell systems for managing suitable automation. Obviously, this entails the painting of a painting batch wherein al the glass panes are provided with the same width.

In this second embodiment, in addition to the measuring bridge device, there is provided also a system for adjusting the application head divided into a control part and a transmission part, provided with two independent motoring managed by brushless motors and movements on ball recirculating runners, capable of reaching centesimal precision in their positioning.

In this way, the transversal position of the application head can be adjusted in the direction of the width to the single glass pane to be painted, in order to adjust it to the difference of thickness on the two sides of the single glass pane.

A first advantage of the present invention consists in the fast replacement of the applying roller, while preserving the safety of human operators. Of course, the replacement must occur during downtimes: the fast replacement allows the shortening of said downtimes.

A second advantage of the present invention is linked to the fact that the roller coater works with a perfectly efficient applying roller, so that glass panes can be perfectly painted, preventing the production of nonconforming products.

A third advantage, linked to the second embodiment measuring the thickness of said glass pane, is the possibility of applying a perfectly uniform layer of paint on all glass panes, even if said glass pane is provided with a non-uniform thickness.

BRIEF DESCRIPTION OF THE DRAWINGS

Additional advantages and properties of the present invention are disclosed in the following description, in which exemplary embodiments of the present invention are explained in detail on the basis of the drawings.

DETAILED DESCRIPTION OF EMBODIMENTS OF THE INVENTION

It is worth remembering that, although the present description refers to the painting of glass panes, the description can be applied to the painting of panels made of any kind of material.

It is also worth remembering that the roller coater indicated with the numeral 1 is generally a component of a more complex painting line, comprising other sundry (not shown) apparatuses placed upstream and downstream said roller coater 1. For example, upstream said apparatus 1 there can be provided apparatuses for the pre-treatment of panels, while downstream there can be provided further apparatuses for applying further paint layers and/or ovens for drying/polymerizing the applied paint.

Figure 1:
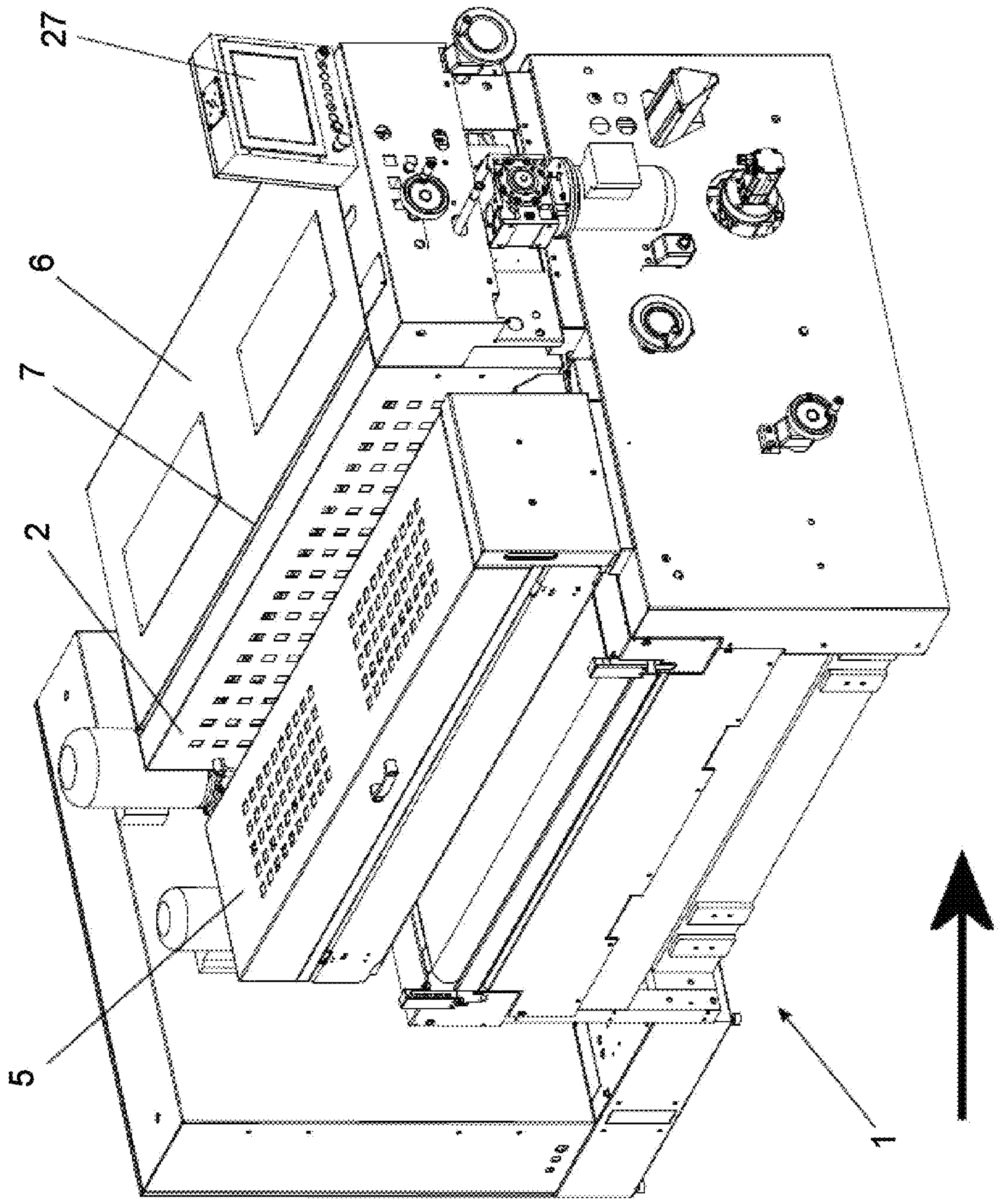
FIG. 1 is an axonometric view of the apparatus with cover.

FIG. 1 shows a roller coater 1 provided with the covers needed for its functioning without risk for human operators, as prescribed by the Machinery Directive 2006/42/CE. The bold arrow shows the conveying direction of the glass panes to be painted. In particular, the roller coater 1 is provided with a cover 2 that is to be removed in order to reach an applying roller 3. For safety reasons, the cover is screwed with two screws to said roller coater 1, screws that can be removed through an ordinary tool. Normally said roller coater 1 is provided with a PLC 27 having an interface that allows a human operator both to modify the set-up of the apparatus, and to detect the working parameters of said roller coater 1.

Figure 2:
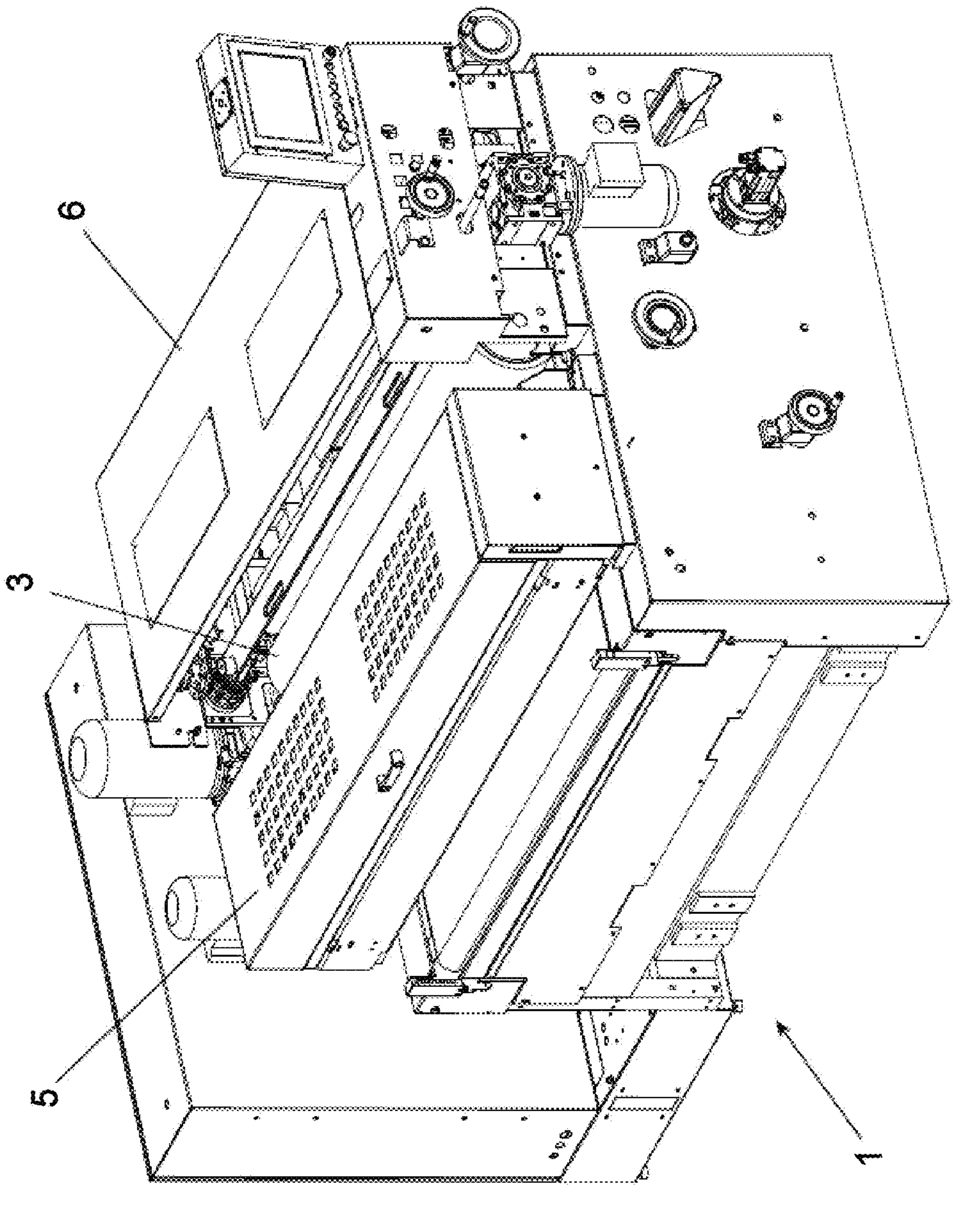
FIG. 2 is an axonometric view of the apparatus, wherein a cover was removed, and applying roller in its working position.

FIG. 2 shows the roller coater 1, wherein said cover 2 was removed and the applying roller 3 in its working position. Said vertical cover 2 covers the applying roller 3. A horizontal cover 6 covers both the applying roller 3 and a dosing roller 11 (visible in FIG. 4). Said applying roller 3 and said dosing roller 11 form an application head.

Figure 8:
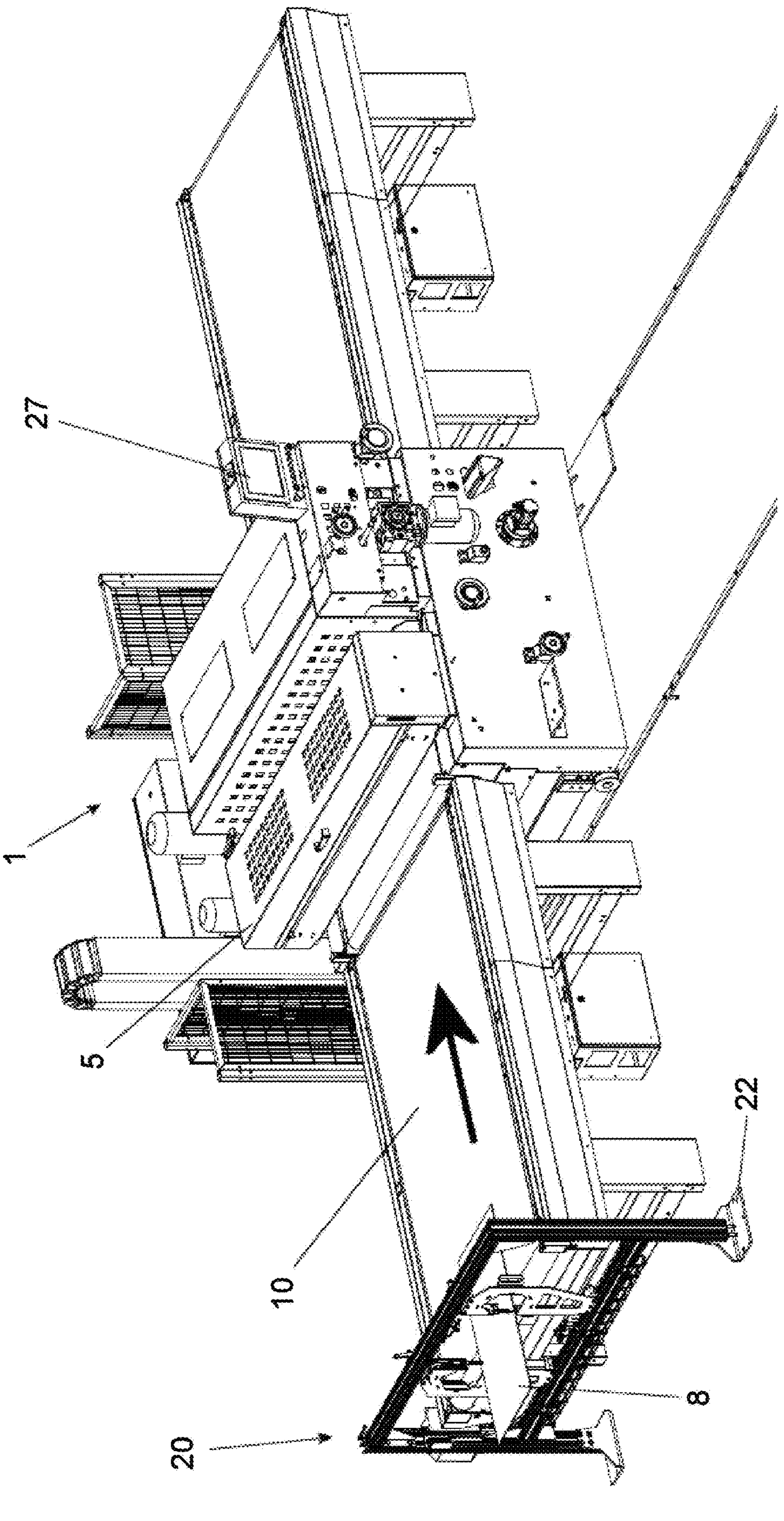
FIG. 8 is an axonometric view of the roller coater provided with a bridge device for measuring panels thickness.

The dosing roller 11 rotates in the conveying direction of the glass pane 8 (visible in FIG. 8). The applying roller 3 is a reverse roller, i.e., rotates in the opposite direction with respect to the conveying of the panes to be painted, and would tend to repel the glass pane, i.e., send it back to its place of origin.

In order to prevent this, in the art using a feed roller 9 is known (visible in FIG. 4), which rotates according to the conveying direction of the panes, and therefore provides for the conveying of the glass pane 8. A further cover 5 covers said feed roller 9.

It is worth mentioning that the inter-axis between said feed roller 9 and the applying roller 3 must be shorter than the minimum length of the shortest glass panel that can be coated in said roller coater. In this case, the distance is 600 mm.

Figure 3:
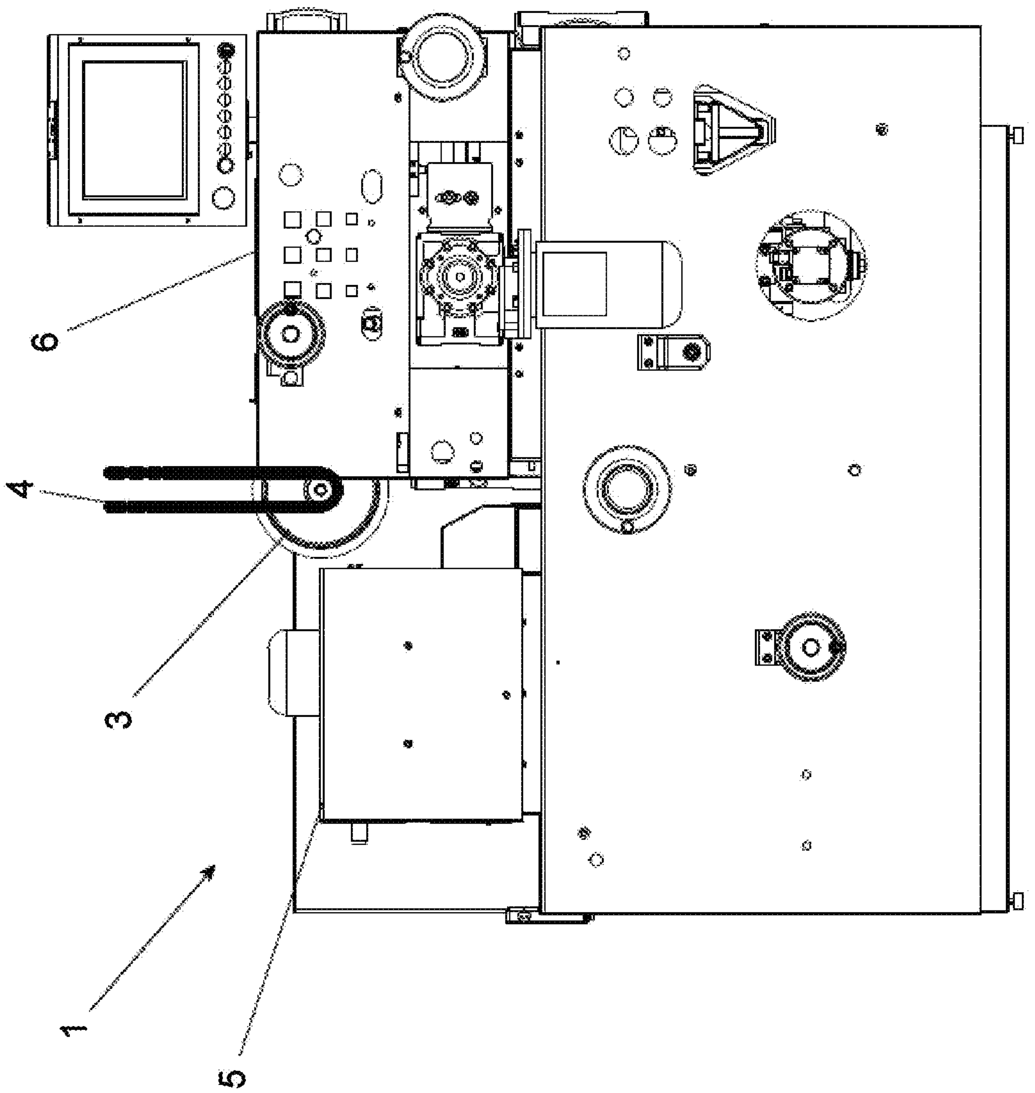
FIG. 3 is a lateral view of the apparatus, wherein a cover was removed, and applying roller in the extraction position.

FIG. 3 shows a lateral view of said roller coater 1, while said applying roller 3 is extracted through two straps 4, each placed at one of its two ends. Said straps 4 are part of a lifting member, suitable for the weight of said roller 3, which is around 200 kg. Said lifting member can be a bridge crane or a stacker, placed in a suitable point; the lifting member is independent from said roller coater 1. Said lifting member is used also for inserting a new applying roller 3 into said roller coater 1, in order to replace said worn/damaged roller 3. Obviously, the roller 3 can be replaced only when said roller coater is stopped (during downtimes).

The positions of the rollers and of the covers of the roller coater 1 must be such, that the applying roller 3 can be extracted without entering into contact with other mechanical parts of the coater 1.

The dosing roller 11 undergoes a markedly lesser wear with respect to the applying roller 3. When the dosing roller 11 must be replaced, the top cover 6 is removed, which opens like a door through a hinge 7 placed at the end of said cover 6 oriented to the entry of said panes.

Figure 4:
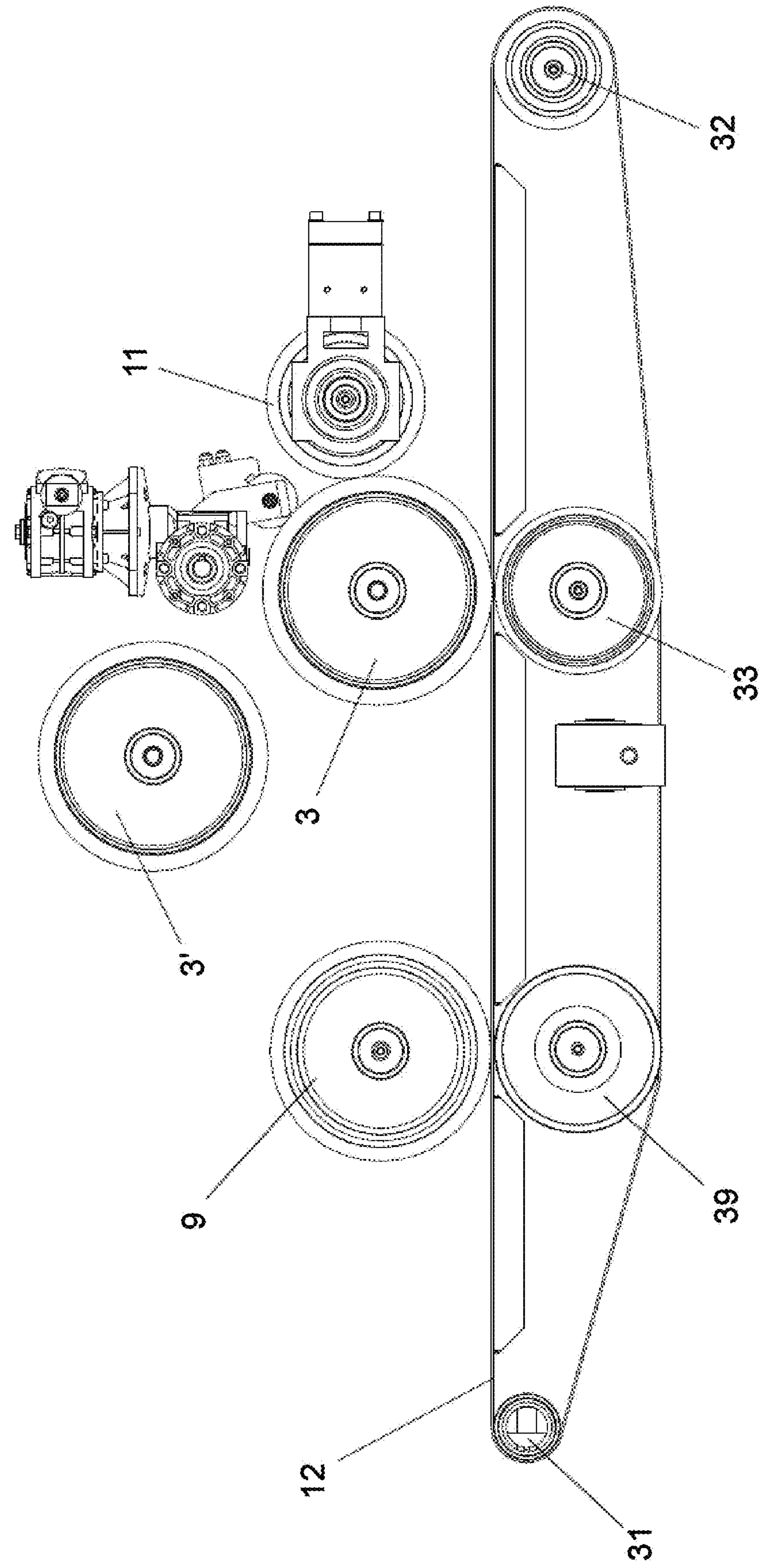
FIG. 4 is a lateral view of the apparatus without covers.

FIG. 4 shows a lateral view of the roller coater 1, wherein the covers 2, 5 and 6 were removed. Said removal allows to observe the feed roller 9, which in use is hidden by said cover 5, the applying roller 3 and the dosing roller 11, which together form the application head, in use hidden by said cover 6. For comparison, the roller indicated with the numeral 3' shows the position for the vertical extraction of said roller 3. In other words, the roller indicated with 3' is in the extraction position shown in FIG. 3.

As customary in the art, the feed roller 9 rotates in the conveying direction of the glass panes, and is coupled to a contrast roller 39. The applying roller 3 is a reverse roller and rotates in the direction opposite to the conveying direction. The dosing roller 11 rotates in the conveying direction.

FIG. 4 allows to observe also a closed belt conveyor 12, which is a component of the roller coater 1. Said conveyor 12 is rectified; as customary, the closed belt rotates around two rollers, the first of which is an idle roller 31, while the second roller is a motorized roller 32.

As explained, the applying roller 3 is a reverse roller, i.e., tends to repel the glass pane 8, therefore there must be provided said feed roller 9, which forces the pane across the applying roller 3 and the contrast roller 33. The contrast roller 33 can be moved in the conveying direction, so that when it is moved from the vertical position with respect to the applying roller 3, a too violent contact with the entry edge of the glass pane 8 is prevented.

The conveying belt 12 is rectified in order to prevent surface bulging, due e.g., to a vulcanized joint, so as to prevent thickness differences along the belt. In fact, said differences in thickness provoke a difference of pressure of the applying roller 3, and therefore a difference in the thickness of applied paint.

The feed roller 9 presses on the glass pane 8 with an interference of about 0.5 mm. The glass pane 8 is intercepted by a photocell at the entry of the roller coater 1, which accompanies it until said pane is held between said applying roller 3 and contrast roller 33, with an interference of 0.5 mm again. The feed roller lifts from the glass pane 8 and the pane is dragged by the belt, in order to prevent vibrations during paint application.

Figure 5:
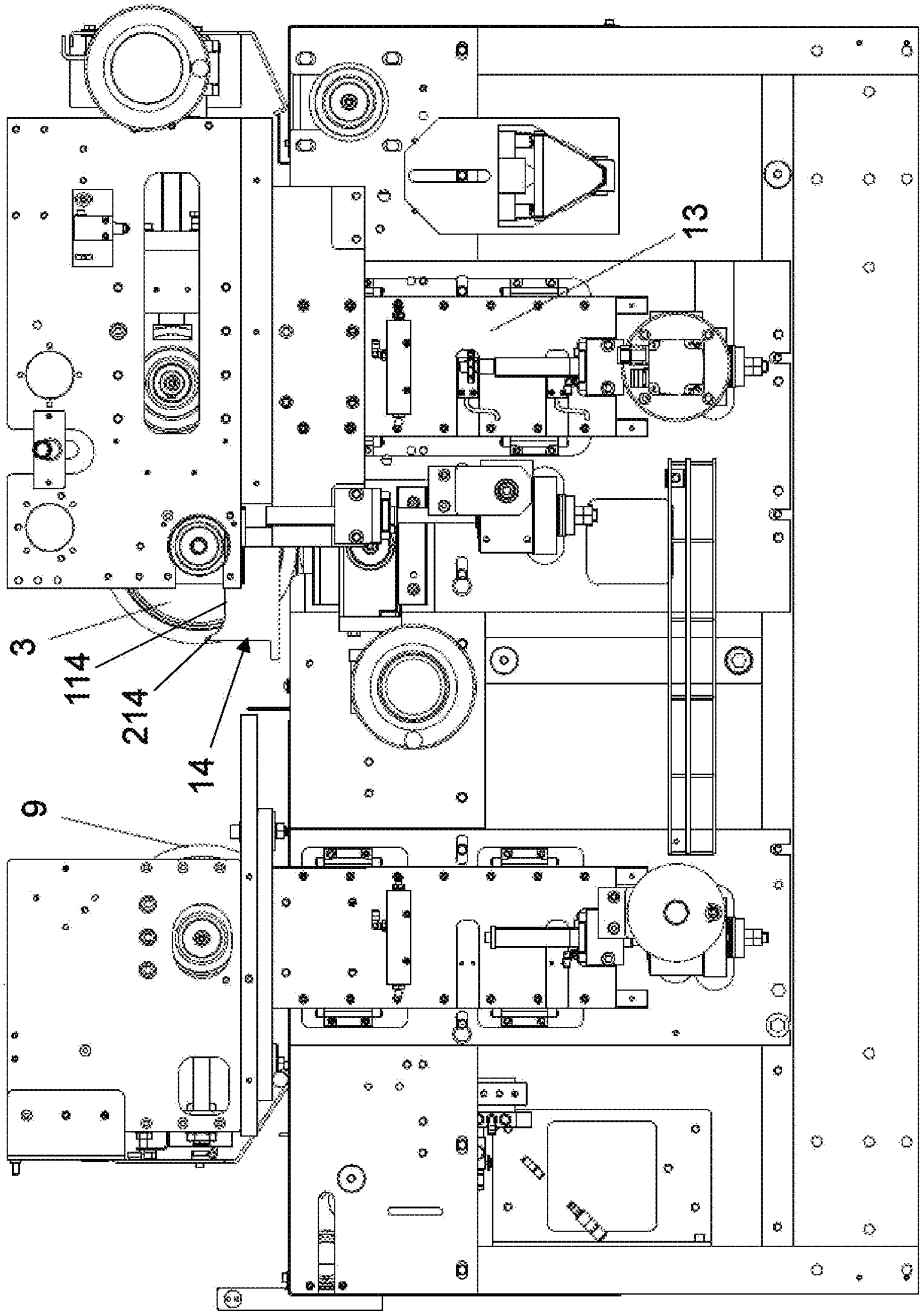
FIG. 5 is a lateral view of the supporting system for rollers.

FIG. 5 shows a lateral view wherein all the covers were removed, and the support systems of said rollers are shown. Said application head, comprising applying roller 3 and dosing roller 11, moves with respect to the conveying belt 12 through two independent systems 13 provided with ball recirculating runners, one system on the right side and one system on the left side. In this way, it can adjust to the actual dimensions of the thickness of the glass pane 8, which can be different on the two sides for some tenths of millimeter. The motorization is provided with brushless motors and encoder for the detection of position, with a centesimal precision.

The feed roller 9 is provided with a similar lifting system, but without independent adjustment to the thickness on its two sides.

As customary in roller coaters, the dosing of paint occurs through the pressure exerted by the dosing roller 11 on the applying roller 3; a stronger pressure decreases the quantity of applied paint. The speed of transport, too, affects the applied quantity in an unwanted way: in fact, a greater speed of the glass panes 8 generally causes an increase of the quantity of applied paint.

In roller coaters, typically the system for adjusting the quantity of applied paint occurs by varying the pressure applied to said dosing roller 11. On some roller coaters, the dosing roller rotates in reverse, i.e., opposite to the conveying direction, and this leads to a removing of paint from said roller, altering the adjustment of the dosing roller; both can influence the quantity of applied paint.

Figure 6:
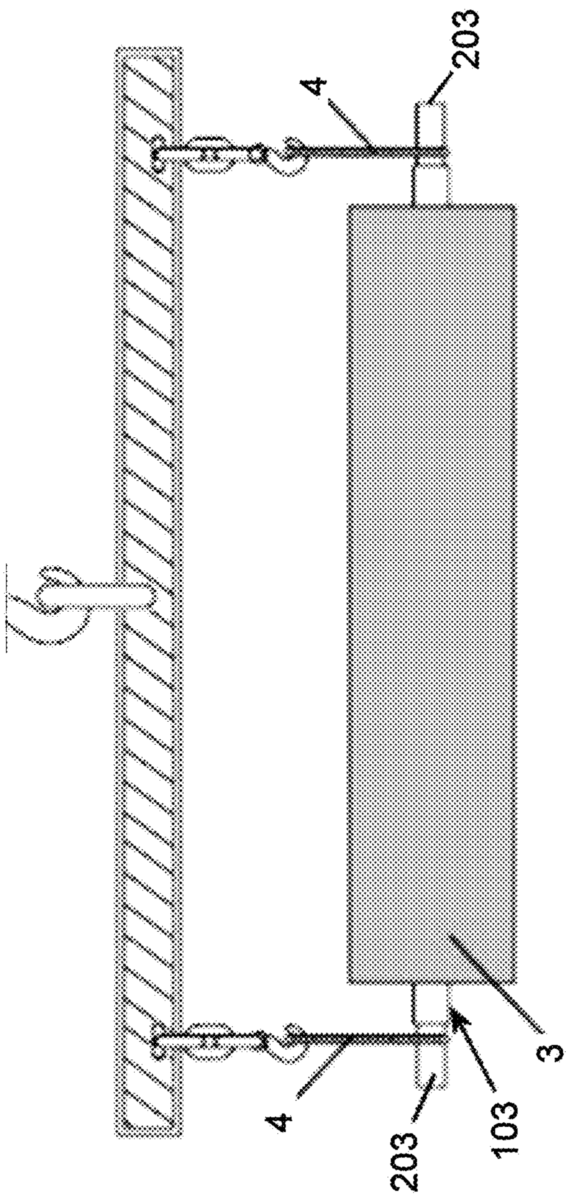
FIG. 6 is a front view of the lifting system for the applying roller.

FIG. 6 shows the lifting member of the applying roller 3 for its replacement. As already explained, said lifting member can be a bridge crane or a stacker suitably placed above said roller coater 1. The lifting member is independent from said roller coater 1.

Figure 7:
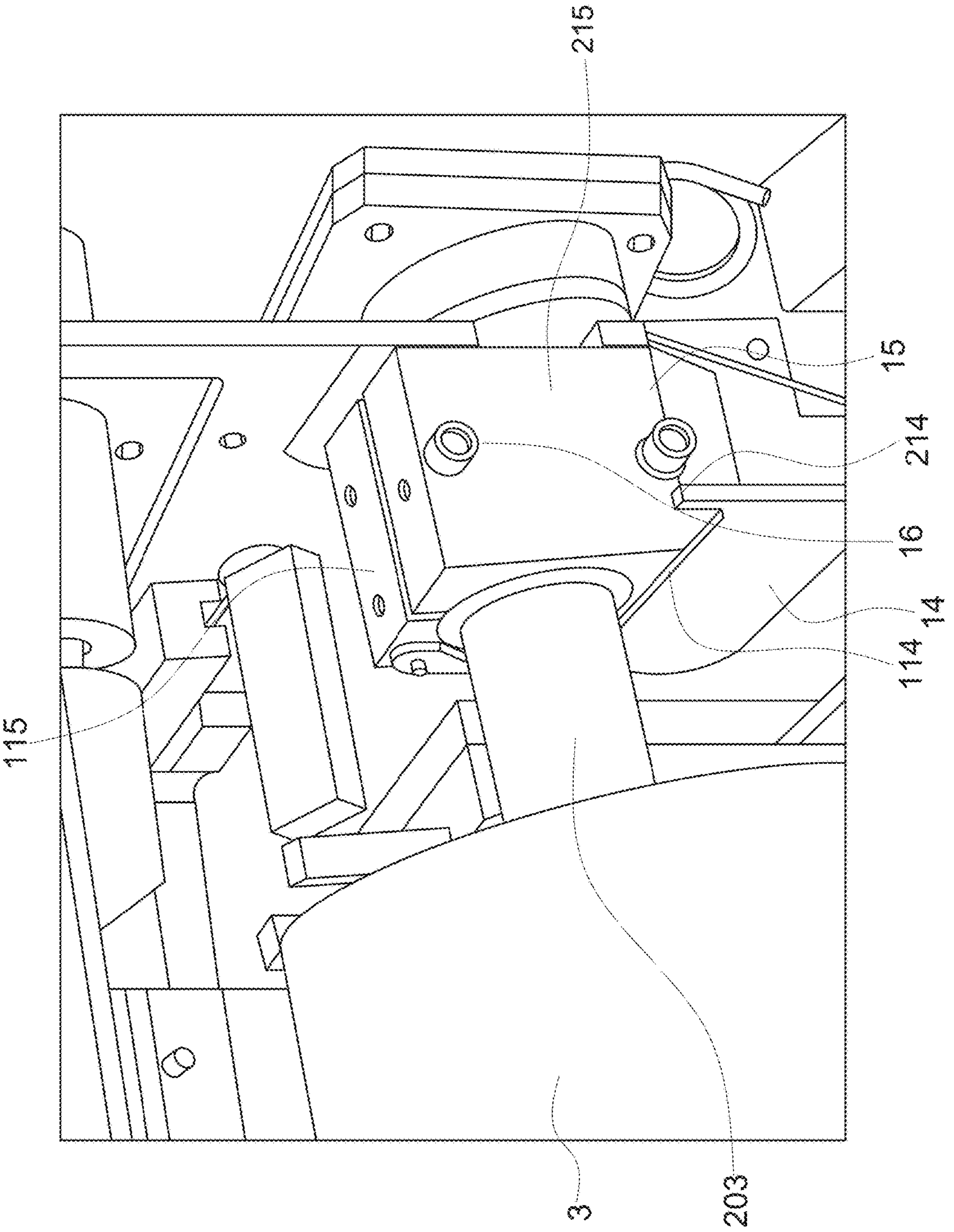
FIG. 7 is an axonometric view of a detail of the supporting system for the applying roller.

FIG. 7 shows a detail of the support for the applying roller 3. When in its working position, said applying roller 3 is held by suitable supports 15 that fix the ball bearings on which the terminal ends 203 of the rotating shaft of the applying roller rotate. In the shown embodiment, said supports 15 are two semi-clamps 115 and 215 that are locked through bolts 16 or through a combination of studs and nuts or other locking means. Each semi-clamp 115, 215 is provided with an internal semi-circular annular surface, said semi-circular surface being divided on said two semi-clamps 115, 215 according to a vertical section plane and radial with respect to the shaft 103 and to the relative ends 203 protruding from the heads of the applying roller 3. When the applying roller 3 is replaced, said supports are opened, so separating said semi-clamps 115, 215, one of which, i.e., the one 115 oriented toward the pressing roller 9, is stationary, while the other 215 is removable. The applying roller 3 can leave and separate from said semi-clamp 115, and slides with its ends 203 on a corresponding guiding support provided on the roller coater 1 that defines a transferring path of the roller 3 and of its ends 203 in a position suitable for their grabbing through lifting means of said roller 3.

In particular, FIG. 7 shows an embodiment wherein said supports are in the form of a supporting bracket 14 provided with a top side 114 for supporting the corresponding end 203 of the shaft 103 of the roller. Said surface is substantially horizontal, preferably slightly tilted downwards, starting from an end that is provided at a level such that the supporting surface 114 is at the level of the horizontal tangent of the bottom side of the semi-circular room engaging said semi-clamp 115. At the opposed end of each bracket, and in a position preferably coinciding with reference to the transversal axis of the machine parallel to the axis of roller/s 3 and/or 9 and/or 11, each bracket is provided with an end of stroke 214, which in the shown embodiment is in the form of a prominence or tooth protruding upwards of the surface 114. Such prominence or tooth has the purpose of preventing the fall of the roller 3 beyond the end of said brackets 14 once its supports are removed and the roller has slid along them. The roller is so stopped in the position wherein the applying roller 3 is free at its top from constructive parts of the apparatus 1 and can be lifted from the brackets as above shown and described with reference to FIG. 6.

The embodiment of FIGS. 5-7 is not limiting, but is only a preferred embodiment.

Figure 9:
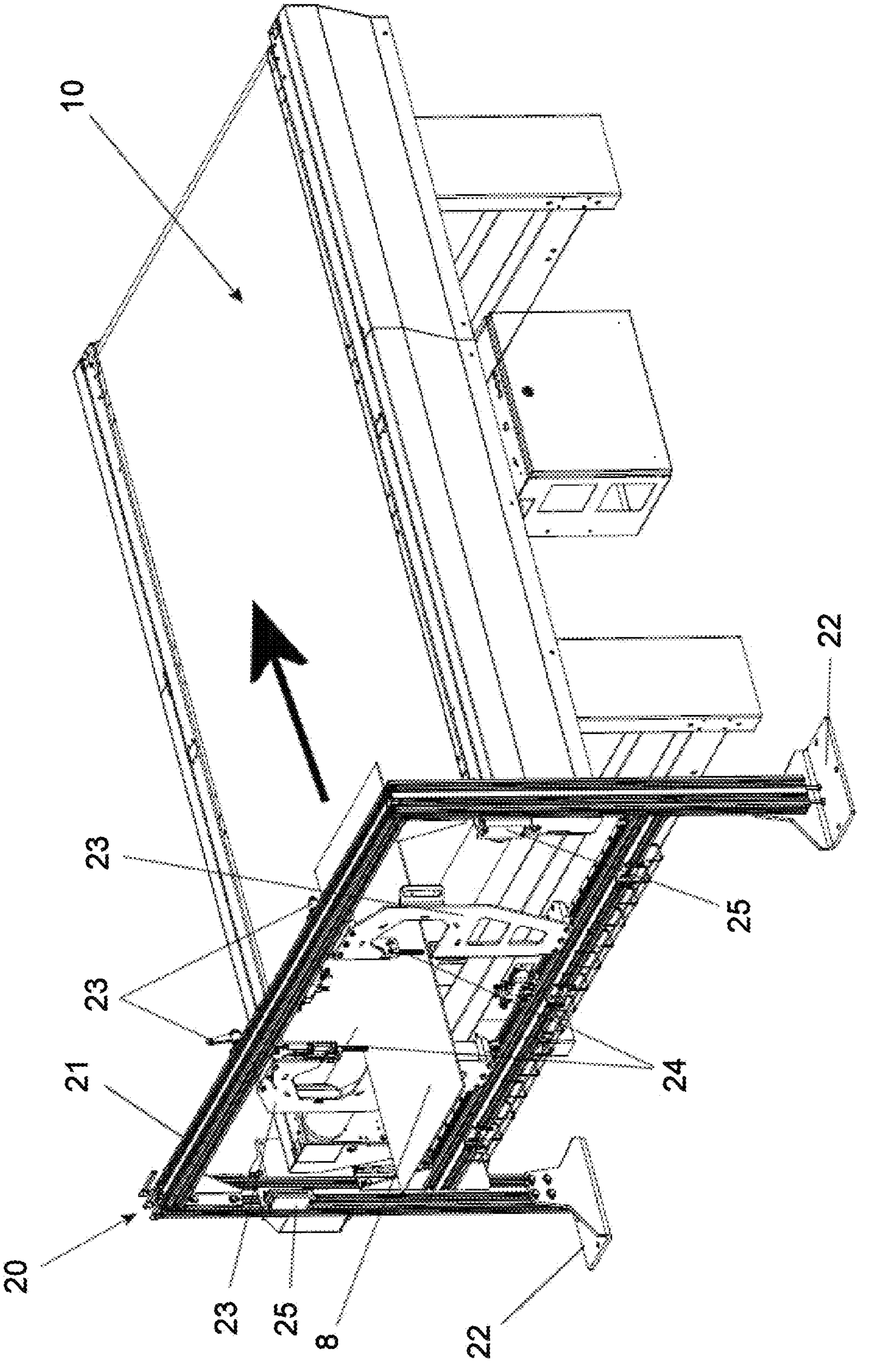
FIG. 9 is an axonometric view of the bridge device and a conveyor.

FIG. 8 and FIG. 9 show the second embodiment of the present invention, in particular a bridge device 20 for measuring the thickness of glass panes 8. The two Figures show the preferred placement for the bridge device 20, i.e., upstream a closed belt conveying system 10 placed upstream said roller coater 1.

FIG. 8 shows a glass pane 8 that is inserted into the roller coater 1 through a closed belt conveyor 10 placed upstream said roller coater 1. The bold arrow shows the conveying direction of the glass panes 8.

Upstream said closed belt conveyor 10 there is provided a bridge device 20 according to the second embodiment of the present invention. Said bridge device allows to measure the thickness of glass panes 8 during their conveyance through said bridge device, so that the data are sent in real time to the roller coater 1, which adapts to the transmitted measures.

FIG. 9 shows an axonometric view of said bridge device 20, placed in proximity of the closed belt conveyor 10. The bold arrow shows the conveying direction of the glass panes 8.

Said bridge device 20 comprises:

A frame 21 provide with feet 22 for fixing it to the floor, so that the bridge device 20 is independent and can be placed in the most suitable points of the painting line. In this way, bumps and/or vibrations generated by the movement of the rotating organs are prevented, which might affect the precision of measuring;

Supports 23 supporting contact sensors; said supports can be slid in a direction which is perpendicular to the conveying direction of the panes 8 to be painted, in order to adapt their position to the transversal measure (width) of the glass pane 8;

Contact sensors 24 (one for each side of the glass); said sensor 24 are divided into two parts, a top part and a bottom part with respect to the surface of the glass pane 8, and are both provided with a pneumatic cylinder, in its turn integral with an encoder detecting the displacement while leaning on the surface through an idle roller;

Transversal photocells 25, detecting the position of the glass pane 8 and its length;

Blocking knobs 26 for blocking said supports 23.

In fact, it is known that glass panes, especially when provided with a low thickness, are not provided with the same thickness on their right and left side, i.e., the sides parallel to the conveying direction of said panes 8. Said difference can be of some tenths of millimeter. As the application of paint on glasses, always destined to solar sector, is particularly delicate and requires an extreme precision, the working pressure of the applying roller 3 on the surface of the glass pane is very important for ensuring the uniformity of the paint layer.

Advantageously, the bridge device 20 is not a component of the roller coater 1 and is fixed to the floor, preventing problems due to vibrations of the roller coater 1 during measuring.

In this second embodiment, although the bridge device 20 is independent from the roller coater 1, nonetheless there is provided a communication system between the bridge device 20 and the PLC 27 of the roller coater 1, allowing to transmit the actual thickness data of each pane 8 to the application head of the roller coater 1 in real time.

Thanks to the use of the bridge device 20, the transversal position of the application head in the direction of width can be adjusted to the actual shape of the pane to be painted, in order to adapt it to the thickness difference between the two sides of the pane, using the above explained system with ball recirculating runners and brushless motor.

In short, the measuring of the thickness of glass panes 8 and the consequent painting of the glass panes 8 occurs as follows:

(a) The glass pane 8 conveyed in the painting line is intercepted by the photocells 25, activating the measuring sensors 24;

(b) When the glass pane 8 detected by the photocells reaches the two sensors 24, said pneumatic cylinders bring said idle roller in contact with the top and bottom surfaces of the glass pane, and by value difference the actual thickness of the pane is measured;

(c) The measure is transmitted to the PLC 27 of the roller coater 1, which manages the positioning of the application head;

(d) Through two independent motorizations for positioning each of the two sides of the roller 3, said roller can be adjusted to the actual thickness of the glass pane, and with the working pressure optimal for a correct paint application on both sides;

(e) When the photocells 25 detect the end of the glass pane, they send a signal to the measuring sensors 24, which deactivate.

The above description refers specifically to the use of said bridge device 20 for measuring the thickness of glass panes 8 inside a roller painting line for photovoltaic panels. The skilled man cannot miss the fact that any kind of mainly flat panel 8 can be painted in a line comprising the roller coater 1 according to the present invention, e.g., panels made of wood, plastics, fibrocement, etc. Similarly, the skilled man cannot miss the fact that the bridge device 20 according to the present invention can be used in a production line comprising machines of any type working in contact with a main surface of said panel 8, e.g., machines for cleaning said main surface, or sanding machines.

LISTING OF REFERENCE NUMBERS

1 roller coater
2 cover
3 applying roller
4 strap
5 cover for the feed roller
6 cover
7 hinge
8 glass pane
9 feed roller
10 closed belt conveyor
11 dosing roller
12 rectified conveyor
13 ball recirculating runners system
14 bracket
15 support for the applying roller
16 screw
20 bridge device
21 frame
22 feet for fixing to floor
23 supports for measuring sensors
24 contact sensors
25 transversal photocell
26 blocking knob
27 PLC
31 idle roller
32 motorized roller
33 contrast roller
39 contrast roller
103 rotation shaft of the applying roller
203 end of the rotation shaft
114 top side of brackets
214 end of stroke
115 semi-clamp
215 semi-clamp

The invention claimed is:

1. A roller coater for applying paint to mainly flat panels provided with different lengths comprised between a minimum and a maximum length workable by the roller coater, comprising, in a conveying direction of the panels:

a feed roller covered by a first cover;

an application head for applying the paint, the application head comprising an applying roller and a dosing roller, wherein the application head is covered by a second, vertical cover and a third, horizontal cover, the second, vertical cover and the third, horizontal cover being removable;

a conveyor for the panels to be painted;

rotation supports, on which ends of a shaft of the applying roller are rotatably mounted, the rotation supports being each adapted to be coupled and decoupled from a corresponding end of the shaft of the applying roller, a working position of the applying roller corresponding to a coupled condition of the ends of the shaft of the applying roller in the rotation supports, the rotation supports being configured to have a withdrawing position;

guiding brackets defining L-shaped translation guides for withdrawing the applying roller, each of the L-shaped translation guides being defined by a substantially horizontal supporting surface and an upwardly extending tooth providing an end of stroke, wherein the L-shaped translation guides enable an initial translation of the applying roller along the substantially horizontal supporting surface for disengaging and distancing, in a radial direction, the ends of the shaft of the applying roller from the rotation supports and in a direction of the feed roller, and a successive translation in a lifting vertical direction from the end of stroke, distancing the applying roller from the conveyor; and a lifting organ of the applying roller, wherein an interaxial distance between the feed roller and the applying roller is at least, sufficient to enable a passage of the applying roller during removal, and shorter than the minimum length of the panels.

2. The roller coater according to claim 1, wherein the second, vertical cover is provided on a side of the applying roller oriented toward the feed roller, wherein the applying roller takes a terminal position at the end of stroke of an initial translation, and wherein the lifting organ of the applying roller comprises two straps each arranged to be coupled one of the ends of the shaft of the applying roller, the two straps being fixed to a lifting organ of a bridge crane or a stacker for lifting the applying roller vertically, from a stroke-end position of the initial translation into a lifted position with respect to the initial translation.

3. The roller coater according to claim 2, wherein the ends of the shaft protrude from heads of the applying roller, the ends of the shaft being fixable in the rotation supports, and wherein the rotation supports are configured as locking clamps of a respective bearing on a respective end of the shaft, the locking clamps being configured to be opened and closed against the bearings, the locking clamps being further configured as a plurality of parts lockable to each other, and separable along a vertical plane as two semi-clamps separable along a radial and vertical plane with reference to the shaft of the applying roller and lockable to each other.

4. The roller coater according to claim 2, wherein each of the guiding brackets is respectively associated to one of the ends of the shaft of the applying roller, each of the ends coinciding, with a respective terminal section of shaft, and wherein each of the guiding brackets is provided at a top surface thereof of with one of the L-shaped translation guides, the guiding brackets being vertically coinciding at least at initial ends thereof with a bottom tangential plane of the rotation support of the corresponding end of the shaft of the applying roller, so that when the applying roller is freed from the rotation supports, the ends of the shaft glide out of a corresponding support and rotate and/or slide on the L-shaped translation guides of the guiding brackets.

5. The roller coater according to claim 4, wherein the top surfaces of the guiding brackets are coinciding with a plane tilted downward with respect to a horizontal plane, the top surfaces having top end that is at a level of the horizontal plane tangent to a bottom point of an annular housing formed by a semi-clamp opposed to the end of stroke provided on the guiding bracket, so that the applying roller automatically slides with both of the ends of the shaft in a direction opposite to the conveying direction of the panels, out of the semi-clamp, and rotates toward the end of stroke of the guiding brackets while being supported by the guiding brackets.

6. The roller coater according to claim 1, wherein the feed roller and the dosing roller rotate in the conveying direction of the panels, the applying roller operating as a reverse roller and rotating in a direction opposite to the conveying direction of the panels.

7. The roller coater according to claim 1, further comprising:

a Programmable Logical Controller (PLC) adjusting the position of the application head for applying the paint with respect to a position of a panel and/or of a conveying plane of the conveyor, according to a measurement of an actual thickness of a single panel measured by a measuring system, and an adjustment system that adjusts a position of the application head according to the measurement of each panel.

8. The roller coater according to claim 7, wherein the adjustment system comprises a first and a second independent motorization, the first motorization being related to a right side of the panel and the second motorization being related to a left side of the panel, the first and the second motorizations being managed by brushless motors and by movements of the panel on ball recirculating runners, so as to reach a centesimal precision in a positioning of the application head, and to further cause movements for a mobile support of the application head with respect to the conveyor, perpendicularly to a conveying plane.

9. The roller coater according to claim 1, wherein the panels are glass panes.

10. A method for roller coating mainly flat panels using the roller coater according to claim 7, the method comprising:

(a) feeding the panels to a painting line;

(b) measuring the actual thickness of each of the panels with the measuring system;

(c) transmitting the measurement to the PLC of the roller coater managing a positioning of the application head; and (d) adjusting, through two independent motorizations, a positioning of each side of the application head according to the actual thickness for each of the panels measured.

* * * * *